United States Patent

[11] 3,576,368

[72] Inventors William E. Goetz
Endwell;
Fred L. Hajny, Vestal, N.Y.
[21] Appl. No. 791,670
[22] Filed Jan. 16, 1969
[45] Patented Apr. 27, 1971
[73] Assignee International Business Machines
Corporation
Armonk, N.Y.

[54] IMAGING SYSTEM
23 Claims, 16 Drawing Figs.

[52] U.S. Cl. .................................................. 355/51,
350/7, 352/84, 352/105, 355/57, 355/65, 355/66
[51] Int. Cl. ....................................................... G03b 27/50,
G03b 27/70
[50] Field of Search .......................................... 355/8, 51,
57, 65, 66; 352/84, 105; 350/6, 7

[56] References Cited
UNITED STATES PATENTS
2,487,671 11/1949 Pratt et al. ..................... 355/66
3,432,231 3/1969 Gardner ......................... 355/8

Primary Examiner—Samuel S. Matthews
Assistant Examiner—Richard A. Wintercorn
Attorneys—Hanifin and Jancin and Norman R. Bardales ABSTRACT: An imaging system having moving optical apparatus for imaging an object on an image receptor, one of which, i.e. the object or the receptor, is also moving and the other is stationary during the imaging cycle. The moving optical apparatus has in a cascaded optically aligned relationship collimating and focusing stationary lenses and a rotatable reflector disposed as an aperture stop between the lenses. During the imaging cycle, the collimating and focusing lenses are in a predetermined optical coupling relationship with the object and image receptor, respectively, as the reflector rotates about a fixed axis position. During the imaging cycle the reflector rotates in a coordinated manner with the moving object or moving receptor, as the case may be, which in coaction with the lenses causes the object to be imaged in the image plane of the receptor in focus and in the same position irrespective of the movement of the object or receptor, as the case may be.

PATENTED APR 27 1971

INVENTORS
WILLIAM E. GOETZ
FRED L. HAJNY

BY *Norman R. Bardales*

ATTORNEY

IMAGING SYSTEM

BACKGROUND OF THE INVENTION

This invention relates to imaging systems and more particularly to imaging systems of the kind having movable optical apparatus which images a moving object on a stationary image receptor or vice versa.

There are known moving optical apparatus in prior art imaging systems of the document copying type which image a stationary document on a moving image receptor. Generally, these known moving optical apparatus having a moving optical element such as a lens or reflector which moves during the imaging cycle. For example, in certain known document copying machines of the xerographic type, the moving element of the optical apparatus is a lens and the moving image receptor is a rotating xerographic drum. During the imaging cycle, the lens moves in a linear path past a stationary mirror forming a virtual image of the document to be copied. The image is projected through the moving lens onto another stationary mirror and from there onto the recording surface of the rotating drum which is in synchronization with the movement of the lens. In still other prior art document copiers, a virtual image of a stationary document is formed by a moving mirror and projected through a stationary lens onto the image recording surface of a rotating drum via another but stationary mirror. The moving mirror moved in a linear path in some prior art devices, and in others it pivoted about a fixed axis.

In the aforedescribed prior art imaging systems, the movement of the optical element caused a scanning of the stationary document. In any given instant of time, the optical apparatus projected the image of a particular linear elemental portion of the object in focus onto the moving recording surface. Images of parallel linear elemental portions of the object, which were adjacent to the aforementioned particular linear elemental portion, were simultaneously projected by the optical apparatus onto the recording surface but, however, were projected out of focus. The focusing of the image was further adversely affected by the curvature of the drum. These adverse effects were somewhat mitigated by the use of an apertured opaque member which was juxtaposed in close spatial relationship to the drum with the aperture in optical alignment with the optical apparatus, and/or by the inclusion of a transparent document supporting member having its center of curvature on the scanning element. However, in those prior art systems using the apertured opaque member, the images of the linear elemental portions of the object closely adjacent to the aforementioned particular linear elemental portion were not able to be fully blocked by the opaque member and consequently passed through the aperture resulting in distortion of the image on the recording drum. In those prior art systems where a curved transparent document supporting member was utilized, it was found to be unsatisfactory in certain cases. For example, the curvature of the supporting member made it difficult for the imaging of relatively inflexible objects such as a hard cover book or the like. As a result, the imaging in such cases was in focus primarily along the points of tangency of the object with the curved supporting member and was defocused at those points of the object which were not in contact with the curved surface due to the inflexible characteristic of the particular document being copied. Therefore, the use of a curved transparent supporting member and/or the use of an aperture was not found to be entirely satisfactory for imaging systems of the aforementioned type, i.e. for imaging systems which image a stationary document on a moving recording surface. For the same reasons, the use of the transparent curved surface and/or the aperture opaque member was not satisfactory for imaging systems in which the image moved and the recording surface was stationary. In addition, the curved surface of the supporting member presented an impediment to the movement of the document in these last-mentioned imaging systems.

Moreover, in the prior art imaging systems, the moving optical apparatus was generally characterized as having a large associated mass. Consequently, the prior art systems had high power driving requirements and/or relatively long imaging cycles and/or return cycles due to the high inertia effects of the system. The moving optical apparatus of these prior art imaging systems were consequently not readily amenable to simple and compact construction, low power driving requirements, and/or relatively short imaging cycles and/or return cycles.

SUMMARY OF THE INVENTION

It is an object of this invention to provide an imaging system with moving optical apparatus which is adaptable either to imaging a moving object on a stationary image receptor or vice versa.

It is another object of this invention to provide the aforementioned imaging system with moving optical apparatus having substantially mitigated and/or no distortion effects.

It is another object of this invention to provide the aforementioned imaging system with relatively simple moving optical apparatus.

Still another object of this invention is to provide the aforementioned imaging system with moving optical apparatus which has low power driving requirements and/or low inertia characteristics.

Still another object of this invention is to provide an imaging system of the aforementioned kind which has relatively short imaging and/or return cycles.

Still another object of this invention is to provide the aforementioned imaging system of either the image recording, image sensing or image viewing types.

Still another object of this invention is to provide the aforementioned imaging system wherein the image receptor is either a photographic recording surface or a xerographic recording surface.

Still another object of this invention is to provide an imaging system of the aforementioned kind which records the image of one or both sides of a document.

According to one aspect of the invention, an imaging system is provided with movable optical apparatus for imaging an object on the image plane of an image receptor means. A predetermined one of the object and image receptor means is in mutually exclusive movement with respect to the other during the imaging cycle of the system. The optical apparatus has in cascaded optical alignment the combination comprising stationary collimating and focusing lens means and rotatable reflector means disposed as the system's aperture stop between the two lens means. The collimating lens means collimates the light from the object during the imaging cycle, it being in a predetermined first optical coupling relationship with the object during the imaging cycle. The focusing lens means is in a predetermined second optical coupling relationship with the receptor means during the imaging cycle. The reflector means, during the imaging cycle, is rotated about a predetermined fixed axis in a predetermined coordinated relationship with the mutually exclusive movement of the object or receptor, as the case may be, and reflects the collimated light from the collimating lens means incident thereto into the focusing lens means. The focusing lens means, during the imaging cycle, focuses the reflected collimated light from the reflector means in focus and in the same position in the image plane of the receptor means irrespective of the mutually exclusive movement of the aforementioned predetermined one of the object and image receptor means.

The invention is particularly useful in imaging systems in either either the object is being fed on the fly to the system and the image receptor is stationary, or where the image receptor moves on the fly and the object is stationary as will become more apparent hereinafter.

The foregoing and other objects, features and advantages of the invention will be apparent from the following more particular description of preferred embodiments of the invention, as illustrated in the accompanying drawings.

BRIEF DESCRIPTION OF THE DRAWING

In the FIGS. like elements are designated with similar reference numerals.

DESCRIPTION OF THE PREFERRED EMBODIMENTS

Figures 1, 3, 4:
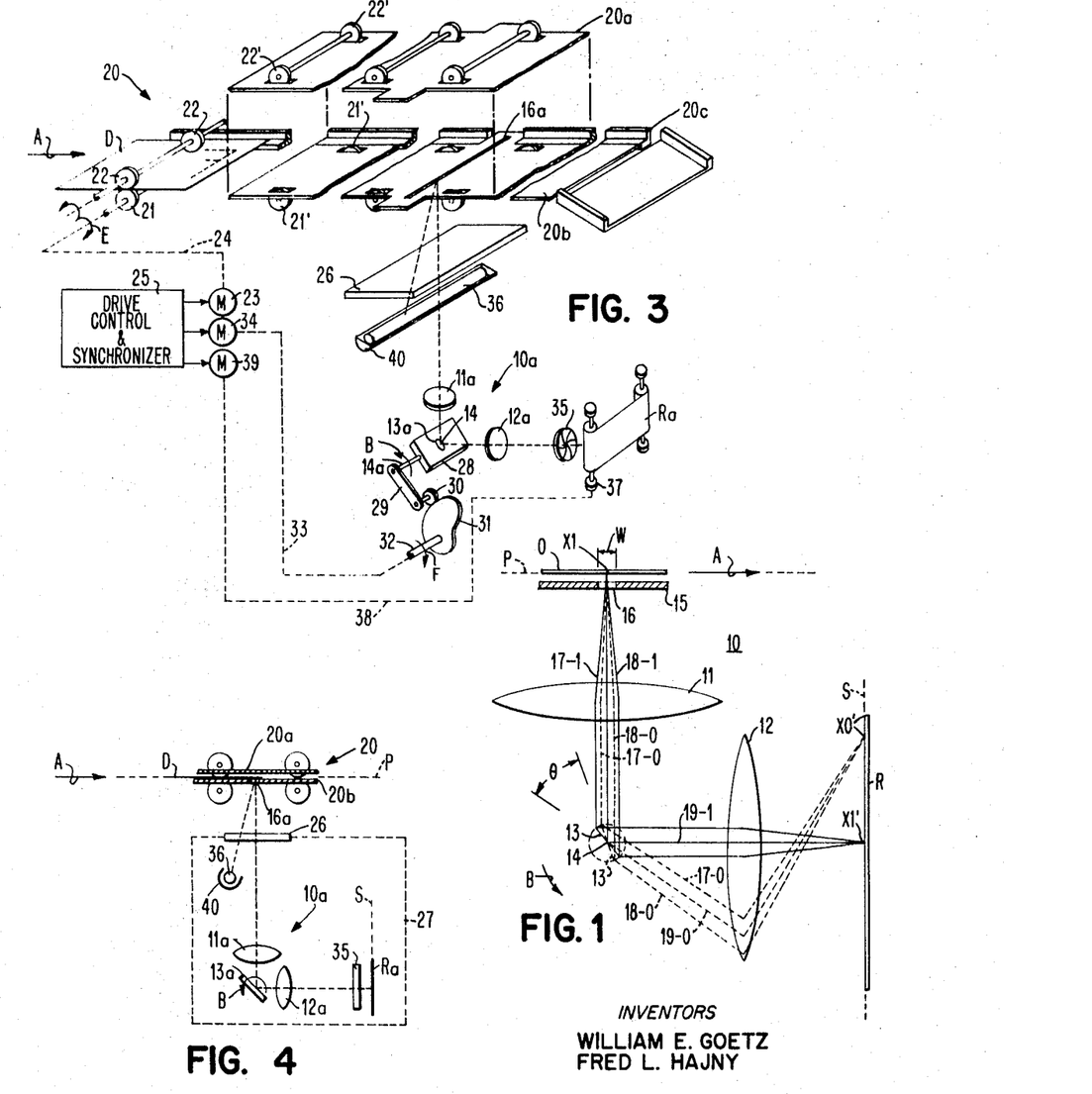
FIG. 1 is a schematically illustrated end view of an embodiment of the imaging system and moving optical apparatus of the present invention.
FIG. 3 is an exploded perspective view, partially illustrated in schematic, of an embodiment of an image recording system of the present invention utilizing the principles of the imaging system and moving optical apparatus of FIG. 1.
FIG. 4 is a partial schematically illustrated end view of the embodiment of FIG. 3.

Referring to FIG. 1, the moving optical apparatus 10 of the imaging system of the present invention includes the combination of schematically illustrated optical elements 11, 12, 13 which are in cascaded optical alignment. Elements 11 and 12 are stationary, i.e. fixed, and are collimating and focusing lenses, respectively. During the system's imaging cycle, the object O is optically coupled to lens 11 and the image receptor R is optically coupled to lens 12. Moreover, during the imaging cycle one of the aforementioned elements, O, R is in mutually exclusive movement with respect to the other. That is to say, one of these elements O, R is moving while the other remains stationary. In the particular embodiment of FIG. 1, the object O moves while the receptor R remains stationary during the imaging cycle.

Optical element 13 is disposed as the aperture stop of the system between lenses 11 and 12 and in particular is a rotatable reflector such as a mirror or the like. In FIG. 1, the reflector 13 is rotatable about a fixed axis which is located in substantial close proximity to the point 14 and is normal to the plane of the drawing. The point 14 is located on the reflector surface of reflector 13 and preferably the reflector surface has a symmetrical configuration with the point 14 located at its center. During the imaging cycle, reflector 13 rotates through a predetermined angle Θ.

Optionally provided, as shown in FIG. 1, is an opaque shield member 15, partially shown in cross section for sake of clarity, having an elongated slit 16 which is symmetrically aligned with the optical axis of the apparatus 10. The member 15 is juxtaposed between the moving one of the elements O, R and the particular one of the lens 11, 12 adjacent thereto. Thus, in the particular embodiment of FIG. 1, member 15 is illustrated as being juxtaposed between the object O and lens 11. The slit 16 has a relatively narrow width dimension W relative to its transverse elongated dimension, not shown, which is normal to the plane of FIG. 1. Preferably the member 15 is placed in close proximity with the particular moving element, O or R, which is object O in the embodiment of FIG. 1.

Figure 2A:
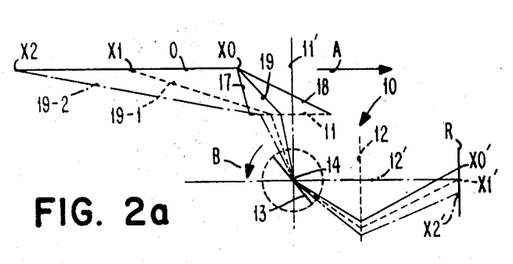
FIGS. 2a—2d are light ray diagrams associated with different positions of the moving optical apparatus of FIG. 1.

Referring now to FIGS. 1 and 2a—2d in greater detail, the imaging system thereof is illustrated as having the aforementioned optical elements 11, 12 and 13. In FIGS. 2a—2d elements 11 and 12 are illustrated as dash lines and element 13 as a solid line for sake of clarity. The respective principal axes 11', 12', c.f. FIG. 2a, of lenses 11, 12 preferably intersect at the point 14 at a predetermined angle such as, for example, 90°. It should be understood that the axes 11', 12' are coplanar with the plane of the drawing in FIGS. 2a—2d. For purposes of explanation, the aperture stop reflector 13 is shown in FIG. 1 at two different positions indicated by the solid and phantom lines, respectively, which occur during the imaging cycle. For similar reasons, the reflector 13 is shown at four different positions in FIGS. 2a—2d, respectively, which occur during the imaging cycle. The positions of reflector 13 illustrated in FIGS. 2b and 2c correspond substantially to its phantom and solid line positions, respectively, of FIG. 1. It should be understood that the FIGS. are not drawn to scale. As aforementioned, during the imaging cycle object O moves while the image receptor R remains stationary. The image plane of receptor R is substantially coplanar with the secondary focal plane S of lens 12 and preferably lies, i.e. is disposed, symmetrically in its field of view.

During the system's imaging cycle, object O moves in a given direction, e.g. the direction indicated by the arrow A, in the primary focal plane P of lens 11 and past its field of view. Simultaneously, reflector 13 is rotated during the imaging cycle by a suitable moving or driving means, not shown, in a coordinated manner with the movement of object O. More particularly, for the given direction A, the reflector 13, in the embodiment of FIG. 1, is rotated in a counterclockwise direction, c.f. arrow B, about the aforementioned axis located near point 14.

Emanating from each point on the object O is a bundle of divergent light rays. For purposes of discussion and sake of clarity, there is shown in FIGS. 2a—2d only three of the object points, to wit: X0, X1, X2 and certain particular ones of their associated light rays. The points X0, X1, and X2 are colinear and the line so formed is coplanar with the plane of the drawing. The points X0, X1, and X2 are sequentially intersected by the principal axis 11' of lens 11 as the object O moves in the direction A during the imaging cycle. By way of example, in each of the FIGS. 2a—2d only three of the rays 17—19 from the bundle associated with the object point X0 are illustrated. Moreover, for sake of clarity, only the divergent portions of the rays 17 and 18 are shown in each of the FIGS. 2a—2d. The portions of the rays 17 and 18 which are collimated by the lens 11 are not shown for sake of clarity. For the same reasons, the collimated portions, if any, of the light rays 17 and 18 that are incident to reflector 13 are not shown in FIGS. 2a—2d. Likewise, the converging or focused portions, if any, of the rays 17 and 18 that pass through the lens 12 are not shown. It should be understood that the rays 17—19 are coplanar with the plane of the drawing and that rays 17 and 18 represent the limit or extreme rays in that particular plane which are intercepted by the field of view of lens 11. Ray 19 is the ray of the bundle associated with the point X0 known or referred to in the art as the chief or principal ray, that is, the ray that intersects the center of stop 13. For sake of clarity and explanation, only the chief rays 19–1 and 19–2, illustrated as dash lines and dash-dot lines, respectively, of the respective bundles of light rays associated with the object points X1 and X2, respectively, are shown in FIGS. 2a—2d.

The operation of the embodiment of FIG. 1 will now be discussed with reference to FIGS. 2a—2d and for this purpose it is assumed that the aforementioned optional member 15 is not provided. In FIG. 2a, the imaging cycle has commenced and the moving object O, as viewed therein, is to the left of the principal axis 11' of lens 11 and the reflector 13 is rotating in the direction B. From each object point a bundle of light rays emanate. Light rays which belong to the same bundle and are in the field of view of lens 11 are collimated by lens 11 in the same direction. Because of the different positions of the object points with respect to the lens 11, each of the bundles of light rays, as collimated, has its own mutually exclusive direction of collimation. Thus, for example, those light rays of the bundle which is associated with X0, which are collimated by lens 11 emerge therefrom in the same directions and are parallel to the direction of the collimated portion of their associated chief ray 19, that is, the portion of ray 19 illustrated in FIG. 2a between lens 11 and reflector 13. Thus, it should be understood a plurality of collimated light rays, including the chief ray 19, which are derived from the bundle associated with point X0 are emanating from the lens 11. For the particular angular inclination or position of member 13, shown in FIG. 2a, those collimated light rays associated with the point X0 which are incident to the reflector 13 are reflected towards the focusing lens 12 by reflector 13 at an angle of reflection corresponding to their respective angle of incidence. Thus, the reflected collimated light rays, which are derived from the bundle X0, have the same direction as the reflected collimated portion of their associated chief ray 19, that is the portion of ray 19 illustrated in FIG. 2a between the reflector 13 and the lens 12. These last-mentioned reflected collimated light rays which are incident to lens 12 are focused exclusively in turn in the image plane of the stationary receptor R at the conjugate image point X0'.

Simultaneously, the light rays of the bundle associated with object point X1, which are in the field of view of lens 11, are collimated by the lens 11 in a direction which is parallel to the collimated portion of their associated chief ray 19–1. Because the point X1 is more remote than the point X0 from lens 11, the direction of the collimated rays associated with point X1 is different from the direction of the collimated rays associated with point X0. Thus, as shown in FIG. 2a, the angle between the collimated portion of the chief ray 19–1 and the optical axis 11' of lens 11 is greater than the corresponding angle between the collimated portion of the chief ray 19 and axis 11'. Consequently, the angle of incidence between the incident collimated light rays, which is associated with point X1, and the reflector is correspondingly different from, and more particularly is less than, the angle of incidence between the incident collimated light rays, which is associated with the point X0, and the reflector 13. The incident collimated light rays of the bundle derived from point X1 is reflected therefrom at an angle of reflection corresponding to its angle of incidence. Moreover, the last-mentioned reflected collimated light rays are reflected in their own particular mutually exclusive direction. Accordingly, the reflected collimated light rays, which are associated with the point X1 and which are incident to the lens 12, are exclusively focused by the latter at the conjugate image point X1'.

In a similar manner, the conjugate image point X2' is formed from certain ones of the light rays of the bundle which is associated with the object point X2. The image points X0', X1', and X2' are in focus and the relative spacing between the points X0', X1', and X2' is directly proportional to the spacing between the object points X0, X1, and X2 and depends on the respective focal lengths of lenses 11 and 12.

Figure 2B:
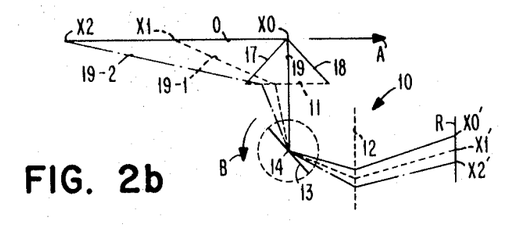
Figure 2C:
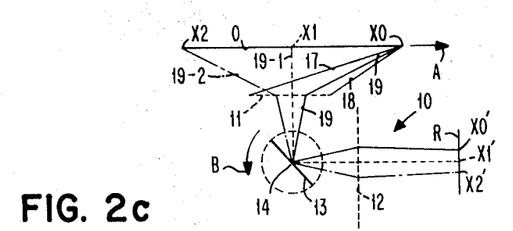
Figure 2D:
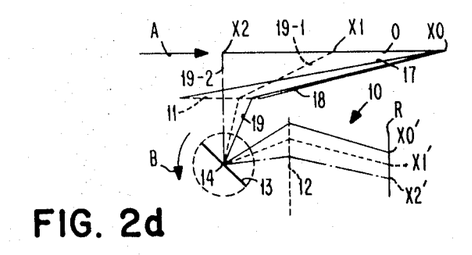

Referring now to FIG. 2b, the object O has moved to the position such that the chief ray 19 associated with the point X0 is coincident with the optic axis or principal axis 11', c.f. FIG. 2a, of lens 11 and the reflector 13 has advanced further in the direction B to the angular position shown therein. As before, from each object point a bundle of divergent light rays emanates, c.f. light rays 17—19 associated with point X0, for example. Once again, the light rays which belong to the same bundle and which are in the field of view of lens 11 are collimated by lens 11 in the same direction. Each of the bundles of light rays so collimated again has its own mutually exclusive direction of collimation. Because each of the object points is now in a new position relative to lens 11, the direction of collimation of the particular object point's associated light rays is different from the direction of collimation that it previously had and that it will have thereafter. However, the movements of the reflector 13 and object O are judiciously coordinated such that those incident collimated rays of the bundle associated with any particular object point, when reflected by reflector 13 and collected by lens 12, are maintained exclusively focused in the same spatial position of the stationary image plane thereby producing a stationary conjugate image point. Thus, as is shown in FIG. 2b, each of the chief rays 19, 19–1, and 19–2 because of the new position of their respective associated object points X0, X1, X2 are collimated by lens 11 in a different direction from the direction it previously had, c.f. FIG. 2a, or it will thereafter have, c.f. FIGS. 2c, 2d. These new collimated directions coact with the new angular position of reflector 13 to cause the rays 19, 19–1, and 19–2 to be reflected into lens 12 and be focused by the latter at their same respective previous conjugate image point positions.

In FIG. 2c, the object O has advanced to the position where the chief ray 19–1 of object point X1 is coincident with the optic axis 11' of lens 11 and the reflector 13 has further advanced in the direction B. For the reasons previously explained, the incident collimated light rays derived from each of the different object points are again reflected in such a manner by reflector 13 into the lens 12 so as to be focused at their same respective conjugate image point positions. Thus, for example, the bundles of light rays associated with the object points X0, X1, X2, as shown by their respective chief ray 19, 19–1, 19–2 in FIG. 2c, are focused at their previous conjugate image points X0', X1', and X2'.

In FIG. 2d, the object O has advanced to the position such that the chief ray 19–2 of object point X2 is coincident with the optic axis 11' of lens 11 and the reflector 13 has further advanced in the direction B. For the reasons previously explained the object points are imaged by apparatus 10 in the image plane of receptor R in focus and at their previous corresponding conjugate image points. Thus, the moving object O is imaged by the optical apparatus 10 during the imaging cycle in the image plane of the stationary receptor R in focus and in the same position and hence without distortion irrespective of the object's movement.

The imaging system of FIG. 1 is further enhanced by the inclusion of the slotted member 15 as shown in FIG. 1. For purposes of explanation, it is assumed that the chief ray 19–0 of object point X0, not shown in FIG. 1, is coincident with the principal or optic axis of lens 11 when reflector 13 is in the dash line position shown in FIG. 1. Under this condition, a bundle of divergent light rays, such as for example the light rays 17–0 and 18–0, emanates from the point X0. For sake of clarity, in FIG. 1 the light rays associated with the point X0 are shown in dash line form to distinguish them from the light rays 17–1 to 19–1 which are associated with the point X1 and shown in solid line form. It should be understood that for the assumed last-mentioned condition, the portions of the chief ray 19–0, which are between the object O and the reflector 13 are in coincidence with the corresponding portions illustrated in FIG. 1 of the chief ray 19–1 which is associated with point X1 but that rays 17–1 to 19–1 are not present. The divergent portions of the rays from point X0, e.g. rays 17–0 to 19–0, that are passed through slit 16 are collimated by lens 11. The collimated portions of these rays emanate from lens 11 in a parallel relationship with the principal axis of lens 11. The collimated rays derived from the point X0 and incident to the reflecting surface 13 such as the rays 17–0 to 19–0 are reflected toward lens 12. Their angle of reflection corresponds to their angle of incidence to the reflector 13 which is then in the illustrated dash line position. The reflected collimated portions of the rays, e.g. rays 17–0 to 19–0, in turn, which are collected by the lens 12 are focused at the conjugate image point X0' in the image plane of the stationary receptor R. As aforementioned, it should be understood that FIG. 1 is not drawn to scale.

When the reflector 13 of FIG. 1 is in the angular position denoted by its solid outline form, it is substantially at its midway position of its imaging cycle. In this position, the chief ray 19–1 of object point X1 is now coincident with the optic axis of lens 11. It should be understood that under this new condition the movement of object O has remotely removed point X0 from the position of slit 16, and consequently the rays 17–0 to 19–0 are not present. As shown in FIG. 1, divergent portions of the rays, e.g. rays 17–1, 18–1, and 19–1, of the bundle associated with the point X1 are collimated by lens 11 and in a direction parallel to the optic axis of lens 11. The collimated rays which are incident to reflector 13, e.g. rays 17–1 to 19–1, are reflected by it into the lens 12. The reflected collimated portion of the chief ray 19–1 under these circumstances is shown by way of example as being coincident to the optic axis of lens 12. As a result, the reflected collimated portions of the rays 17–1 to 19–1 are focused by lens 12 at the conjugate image point X1' of the image plane of receptor R. Thus, the member 15 in coaction with its slit 16 and the optical apparatus 10 blocks stray light, as well as the light rays from object points not in the immediate proximity of the slit 16. In addition, because the width W of the slit 16 has a finite limitation, for any given instant of time it will also pass the chief rays and their respective closely adjacent related rays of the object points immediately adjacent to or near the particular object point whose chief ray is coincident with the principal axis of lens 11. Nevertheless, each of the chief rays and their closely adjacent related other rays so passed are imaged by the optical apparatus 10 at their respective conjugate image point positions in the image plane of the receptor R in focus and without distortion.

After each imaging cycle, the reflector 13 of FIGS. 1, 2a—2d is returned by the aforementioned driving means, not shown, to its initial position and is ready for the next imaging cycle. In doing so the driving means may be of the type which returns the reflector 13 during the return cycle in the same direction B, or it may be of the type that reverses the direction of rotation of the reflector 13 during the return cycle. Because the reflector 13 is the aperture stop of the system, it may be relatively small since the chief rays of the various object points all pass through its center. This allows the moving reflector 13 to be constructed with a relatively low mass. The concomitant low inertia characteristic of the reflector 13 allows fast imaging cycles and/or faster return cycles. The initiation of the imaging cycle may be synchronized, by suitable means not shown, when the moving object reaches a suitable predetermined position with respect to the lens 11.

The imaging system illustrated in FIGS. 1, 2a—2d may be of the image recording, image viewing or image sensing types. For example, as an image recording system the receptor R could be the recording surface of an image recorder such as the photographic emulsion layer of a photographic film. Alternatively, receptor R could be an image viewing screen in those cases where the imaging system is of the image viewing type. If the imaging system is of the image sensing type then the receptor R may be an image sensor such as, for example, a matrix of electro-optical transducers, e.g. photosensor diodes, PMTs or the like, which convert the image into a corresponding electrical signal.

Referring now to FIGS. 3—4, there is shown an image recording system embodiment of the present invention adapted to microfilm successive moving documents. The document D to be recorded is inserted, for example, by automatic means, not shown, face down into the input end of document guide and feed transport mechanism 20. Mechanism 20, which is shown in exploded view in FIG. 3 for sake of clarity, has a twin set of feed rollers located at its input end, each set consisting of a driver roller 21 and idler roller 22. The document D is adapted to be engaged at each of its respective sides by one of the feed roller sets. For this purpose, the driver rollers 21 are mounted on a common shaft or axle. This axle is coupled by the mechanical connection which is indicated schematically by the dash line 24 to the shaft of driving motor 23. Motor 23, in turn, is energized by a suitable drive control and synchronizer circuit 25 indicated in block form for sake of simplicity. With motor 23 energized, the document D is successively engaged by the succeeding twin sets of feed rollers, e.g. the twin set comprising rollers 21', 22'. It should be understood that the axles or shafts of the driver rollers 21 and the axles of the driver rollers, e.g. rollers 21', of the succeeding feed roller sets are connected in tandem by a suitable gearing system, not shown for sake of clarity. Thus, motor 23 drives each of the driver rollers in the same direction, c.f. arrow E, thus causing the document D to advance in the direction A. The axles of the feed rollers are journaled in bearing, not shown, which are housed in the associated framework, not shown, of the system.

The mechanism 20 also has a pair of guide plates 20a, 20b between which the document moves. The lower guide plate member 20b is provided with an L-shaped channel guide edge 20c along which the side edge T of document D is guided and maintained in alignment. The lower guide member 20b is also provided with an elongated slit 16a which is transverse to the direction A. Slit 16a is functionally the same as the slit 16 of the member 15 of FIG. 1. Beneath the slit 16a there is a transparent window member 26 which is part of the wall of a light tight container or box indicated by the dash line 27 in the simplified schematic view of FIG. 4. Mounted in box 27 is moving optical apparatus 10a, which is similar to the aforedescribed apparatus 10 of FIG. 1. Box 27 is provided with a suitable access port or cover, not shown, for access to the contents of the box 27. With the exception of member 26, the inner surfaces of box 27 and its access cover, not shown, are preferably optically blackened to mitigate the effects of stray light. The edges of slit 16a and the surface of members 20b and 20c which face window member 26 are also preferably blackened for the same reasons.

Apparatus 10a includes collimating lens 11a, focusing lens 12a, and eliptical-shaped reflector 13a which is symmetrically mounted on the support plate member 28. A shaft 14a is affixed to the edge of member 28. Affixed to the shaft 14a is a link 29 which is also affixed to the shaft of cam follower 30. Follower 30 is biased by gravity or by other suitable means such as a spring, not shown, or the like against the cam surface of cam 31. The drive shaft 32 of cam 31, in turn, is mechanically coupled as indicated by the dash line 33 to the shaft of motor 34 which drives the cam 31 in the direction F, i.e, in a direction that will cause reflector 13a to rotate in the direction B about shaft 14a during the imaging cycle of the system, and in the reverse direction during the return cycle. In other words, the cam surface of cam 31 is designed so that in response to the rotation of shaft 32, the cam follower causes the link 29 and consequently the shaft 14a and reflector 13a to oscillate about the central axis of shaft 14a through a predetermined angle. The shafts 14a and 32 are journaled in bearings, not shown, mounted in a wall, not shown, of container 27. Also mounted in container 27 are an iris or shutter member 35, a light source such as the elongated fluorescent lamp 36, and a roll of film Ra. The unexposed surface of film Ra faces the lens 12a of optical apparatus 10a. One of the film rollers, e.g. roller 37, is mechanically coupled, as indicated by the dash line 38, to the shaft of motor 39. The film rollers are also journaled in bearings, not shown, which are supported by the walls, not shown, of the container 27. Circuit 25 energizes the motor 39 so as to incrementally advance the film Ra between successive imaging cycles. In order not to expose the film Ra by the light from source 36, a suitable light shielding and reflecting member 40 is provided about the light source 36 which causes the light from the source 36 to be directed through the member 26 and incident to the slit 16a.

The lenses 11a, 12a and reflector 13a of apparatus 10a are in cascaded optical alignment and the slit 16a is aligned with the principal or optic axis of lens 11a. Reflector 13a is the aperture stop of the system. The shutter member 35 is included in the field of view of lens 12a and is symmetrically aligned with the principal axis of lens 12a. The primary focal plane P of lens 11a is coplanar with the plane through which the document D is moved and the secondary plane S of the lens 12a is coplanar with the image recording surface, i.e. the aforementioned emulsion surface of the film Ra.

In operation, initially the power is turned on to circuit 25 by connection of the circuit 25 to suitable power supply terminals, not shown, by a pushbutton switch, not shown, or the like. In response thereto, circuit 25 generates a control signal causing motor 23 to be energized which in turn drives the feed roller sets of mechanism 20. Also at this time, if the reflector 13a is not in a position which corresponds to its initial position at the subsequently initiated imaging cycle, the control circuit 25 initiates a temporary control signal which causes motor 34 to be energized and drive reflector 13a to the initial position. For this purpose, circuit 25 includes suitable sensing and logic circuit apparatus, not shown, for sensing the position of reflector 13a and generating the appropriate temporary control signal accordingly. For purposes of explanation, it is assumed that the film Ra has been previously set during the system's last operation so that an unexposed portion of the film's recording surfaces is facing the normally closed shutter 35 at this time.

Next, the first document D is inserted into the input end of transport mechanism 20. When the leading edge of the document D reaches slit 16a, control circuit 25 generates other control signals. In response to these signals, shutter 35 opens, the normally open energization circuit, not shown, of lamp 36 closes causing the light from lamp 36 to illuminate the portion of the document visible through slit 16a, and the motor 34 to be reenergized thereby initiating the rotation of reflector 13a and hence initiating the imaging cycle. By way of example, for this purpose the circuit 25 includes additional sensing and logic circuit apparatus, not shown, for sensing the position of the moving document relative to the slit 16a and generating the control signals in response thereto. Circuit 25 synchronizes, i.e. coordinates, the movement of the document D and reflector 13a so that as the document D moves past the slit 16a it is imaged by the optical apparatus 10a in the emulsion layer of film Ra in focus and without distortion in substantially the same manner as explained in the description heretofore of the operation of apparatus 10 of FIG. 1. As the document is being so imaged, the light rays forming the image expose the film causing a latent image of the document to be formed in film. The respective focal lengths of lenses 11a, 12a are judiciously selected so that the size of the latent image is greatly reduced as compared to that of the document. For example, a reduction of one-fortieth is typical for microfilming on 16 mm film. The angular displacement of the reflector 13a during the imaging cycle is selected to be compatible to the longest size document contemplated to be recorded by the system. Accordingly, when the reflector 13a reaches its terminal position at the end of the imaging cycle, the trailing edge of the document D, depending on its size, is just passing the slit 16a or has already gone by the slit 16a. When the appropriate aforementioned sensing and logic circuit apparatus senses the terminal position of the reflector 13a, it generates additional control signals which cause shutter 35 to close, the energizing circuit, not shown, of lamp 36 to open, and the motor 39 to be temporarily energized which in turn increments roller 37 and places a new unexposed portion of the film Ra in alignment with the now closed shutter 35. During this same period, the reflector 13a is in its return cycle. Motor 34, which is still energized and in coaction with the cam system 29—32 drives reflector 13a in the reverse direction back to its aforementioned initial position. When the reflector 13a is returned to its initial position, the appropriate aforementioned sensing and logic circuit apparatus senses the initial position of the reflector 13a and in response thereto generates a control signal which deenergizes the motor 34 and the reflector remains in the initial position until the next imaging cycle commences. Sufficient spacing is provided between successive documents so that for each document the aforedescribed operating cycle is repeated. It should be understood that after all the imaging positions on the film Ra have been used, it is removed from the box 27 and subjected to a development process which proves a negative of the documents recorded on the film Ra.

Figures 5, 10:
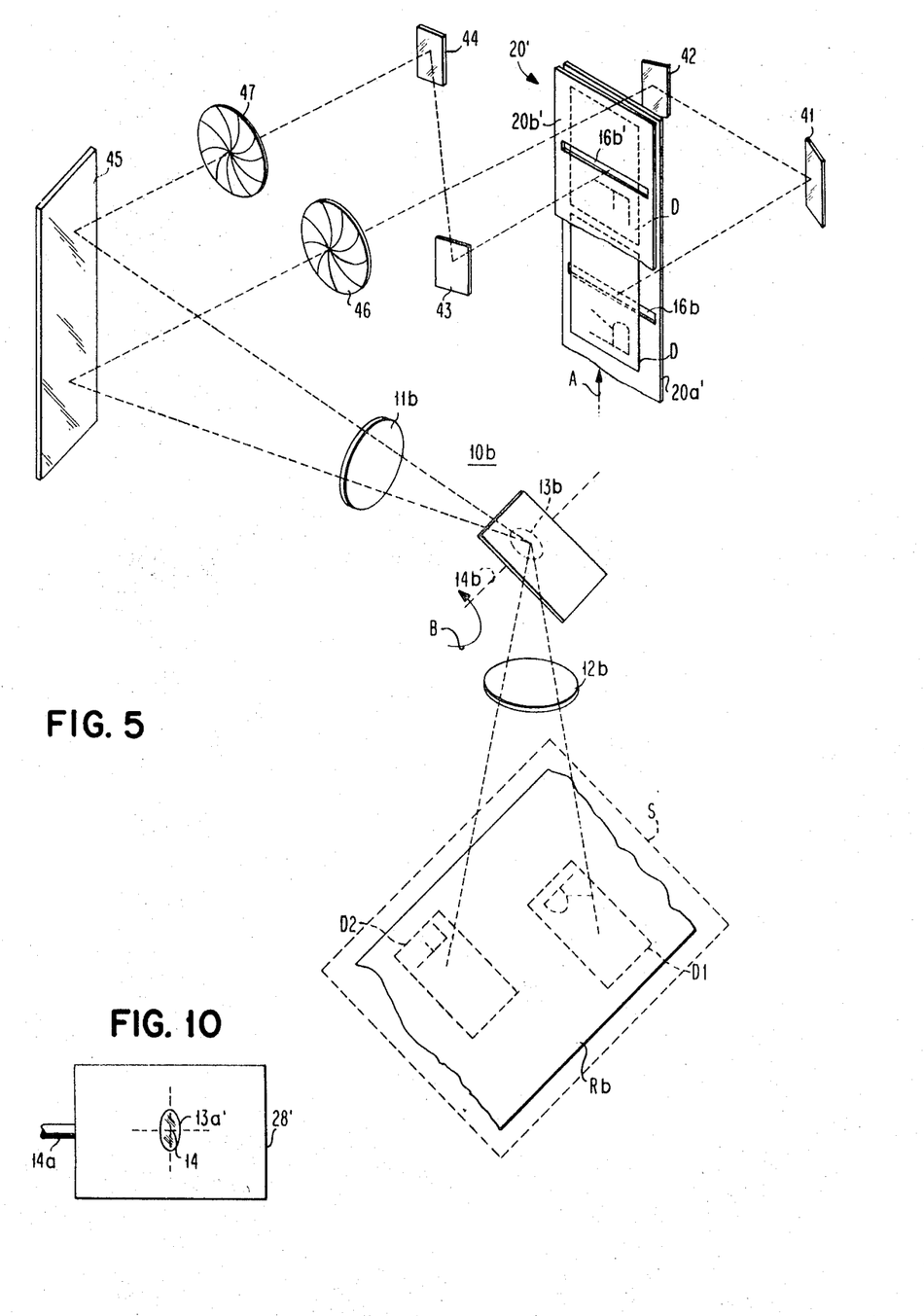
FIG. 5 is a partial schematically illustrated perspective view of another embodiment of an image recording system of the present invention utilizing the principles of the imaging system and moving optical apparatus of FIG. 1.
FIG. 10 is an enlarged top view of an embodiment of the reflector of the optical apparatus of the present invention and which is preferably used in the optical apparatus of the imaging systems illustrated in FIGS. 1—9.

In FIG. 5 there is partially and schematically shown a duplex imaging recording system of the present invention which microfilms both sides of a moving document. The system includes a document guide and feed transport mechanism 20', partially shown, having a pair of guide plates 20a', 20b'. For sake of clarity, the feed mechanism for advancing the document D is not shown but may be similar to the feed roller sets utilized in the system of FIG. 4. The guide members 20a' and 20b' are provided with spaced elongated slits 16b and 16b—', respectively, each of which is functionally equivalent to the slit 16 of FIG. 1. For purposes of explanation and clarity, the lower portion of the guide plate 20b' is broken away in the drawing. The document D to be recorded, after its insertion at the input end, not shown, of the system is advanced by the feed mechanism, not shown, in the direction indicated by the arrow A between guide plates 20a' and 20b'.

The system of FIG. 5 includes moving optical apparatus 10b similar to the previously described optical apparatus 10 or 10a of FIGS. 1 and 3, respectively. The collimating lens 11b, elliptical-shaped reflector 13b and focusing lens 12b of apparatus 10b are thus likewise in cascaded optical alignment and reflector 13b is the aperture stop of the system. Also optically aligned with the apparatus 10b are the elongated slits 16b and 16b' by means of a cascaded series of stationary mirror reflectors 41—45. More specifically, elongated slit 16b is optically aligned with lens 11b by virtue of the optical coupling provided by mirrors 41, 42, and 45. Similarly, elongated slit 16b' is optically aligned with lens 11b by virtue of the optical coupling provided by mirrors 43, 44 and 45. A normally closed shutter member 46 is disposed in the optical path between the elongated slits 16b and collimating lens 11b. Similarly, a normally closed shutter member 47 is disposed in the optical path between the elongated member 16b' and lens 11b. The sum of the distances between the slit 16b and mirror 41, between mirrors 41 and 42, between mirrors 42 and 45, and between mirror 45 and lens 11b is equivalent to the distance between lens 11b and its principal focal plane. Likewise, the sum of the distances between the slit 16b' and mirror 43, between mirrors 43 and 44, between mirrors 44 and 45, and between mirror 45 and the lens 11b is also equivalent to the focal distance between the lens 11b and its principal focal plane. Coincident with the secondary plane S of the focusing lens 12b is the emulsion surface of a film Rb, partially shown.

In operation, the document D is advanced in the direction A between guide plates 20a', 20b'. It should be understood that the system of FIG. 5 has a pair of successive imaging cycles for each document it records, each cycle being associated with the imaging of a particular different one of the opposite faces of the document. Thus, for purposes of explanation, the same document D is illustrated in FIG. 5 in two different positions which occur during the first and second paired imaging cycles, respectively. Initially, after the system power is turned on a control circuit, not shown, generates a control signal that causes the drive mechanism, not shown, to become operative. After the first document D is inserted in the input end of the transport mechanism 20', it begins to advance in the direction A. Also, prior to the leading edge of the document D reaching the first slit 16b, the reflector 13b is set to its initial imaging position, if it is not already there, by suitable sensing and logic circuit apparatus and positioning means which are included in the aforementioned control circuit, not shown. When the leading edge of the document D reaches slit 16b, the aforementioned control circuit, not shown, generates control signals which cause the normally closed shutter 46 to open and the reflector 13b to begin rotating in the direction B and to commence the first imaging cycle of the pair associated with the document D. It is assumed that prior to this, the film Rb has been incremented, by means not shown, so that an unexposed portion of the emulsion layer of the film R$b$ is facing lens 12$b$. As the first imaging cycle takes place an object image of that portion of the face of the document D facing the slit 16$b$ and exposed thereby is formed in the mirror 45 in coaction with the mirrors 41, 42. The object image so formed in mirror 45 in turn is imaged by the optical apparatus 10$b$ during the first imaging cycle in the emulsion surface of film R$b$ in focus and without distortion in a manner similar to that previously explained with respect to the description heretofore of the operation of the optical apparatus 10$a$ of FIGS. 3-4. Consequently, during the first imaging cycle, a reduced latent image D1 of the face of the document D facing slit 16$b$ is formed in the emulsion layer of film R$b$. The angle of rotation of the reflector 13$b$ during the imaging cycle is made compatible with the longest size document intended to be recorded by the system of FIG. 5 and consequently at the end of the first imaging cycle the trailing edge of the document D will be passing out of view of the slit 16$b$ or will have passed out of view of the slit 16$b$ depending on the size of the document. At the end of the first imaging cycle, the aforementioned control circuit generates control signals which cause shutter 46 to close and which returns the reflector 13$b$ to its aforementioned initial position where it remains until the next imaging cycle. During this period the document D is being advanced in the direction A towards the second slit 16$b'$. The spacing between the slits 16$b$ and 16$b'$ is judiciously selected so that the longest size document intended to be recorded by the system does not reach the second slit 16$b'$ until the first imaging cycle is over and the aforementioned return cycle and closing of shutter 46 is accomplished.

When the document D reaches the second slit 16$b'$, the aforementioned control circuit, not shown, opens shutter 47 and the second imaging cycle of the pair is initiated as the reflector 13$b$ begins to rotate in the direction B from its aforementioned initial position. As a result, a reduced latent image D2 of the face of the document facing slit 16$b'$ is recorded in the film R$b$ in focus and without distortion. At the end of the second imaging cycle, the aforementioned control circuit, not shown, generates control signals that close shutter 47, returns the reflector 13$b$ to its initial position where it remains until the next imaging cycle, and increments the film R$b$ so as to provide a new unexposed portion facing the lens 12$b$. Sufficient spacing is provided between successive documents so that for each document the aforedescribed operating cycle is repeated. It should be understood that after all the imaging positions on the film R$b$ have been used, it is subjected to a development process which provides a negative of the documents recorded on the film R$b$.

Figure 6:
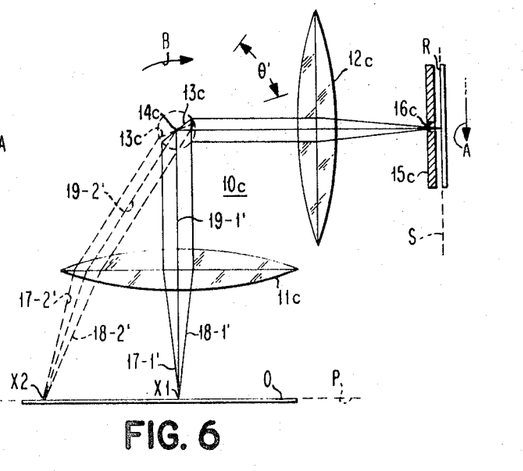
FIG. 6 is a schematically illustrated end view of another embodiment of the imaging system and moving optical apparatus of the present invention.
Figure 7A:
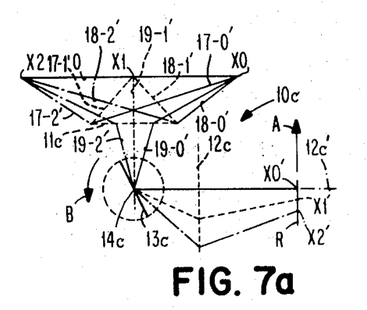
FIGS. 7a—7c are light ray diagrams associated with different positions of the moving optical apparatus of FIG. 6.
Figure 7B:
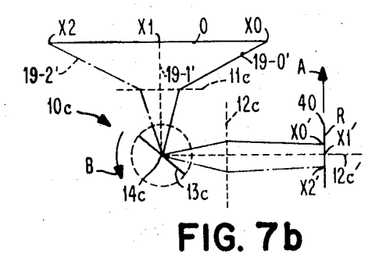
Figure 7C:
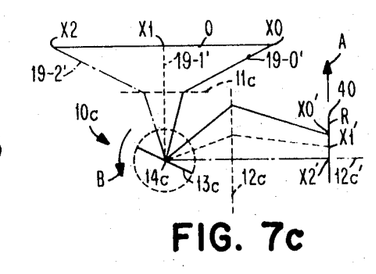

Referring now to FIGS. 6, 7$a$—7$c$, the receptor R is in mutually exclusive movement with respect to the object O during the imaging cycle of the imaging system embodiment illustrated therein. Stated another way, the receptor R is moving while the object O remains stationary during the imaging cycle.

The moving optical apparatus 10$c$ of the system of the FIGS. 6, 7$a$—7$c$ is substantially identical to the optical apparatus 10 of FIGS. 1 2$a$—2$d$. More particularly, apparatus 10$c$ includes the combination of schematically illustrated optical elements 11$c$, 12$c$, and 13$c$, which are in cascaded optical alignment and identical to the corresponding elements 11, 12, 13 of FIGS. 1, 2$a$—2$d$. Accordingly, elements 11$c$, 12$c$, and 13$c$ are a stationary collimating lens, a stationary focusing lens, and a rotatable reflector 13$c$ which is the aperture stop of the system. Optionally provided, as shown in FIG. 6, is an opaque shield member 15$c$, partially shown in cross section, having an elongated slit 16$c$ that is symmetrically aligned with the principal axis of lens 12$c$. The member 15$c$ is juxtaposed between lens 12$c$ and the moving receptor R, and preferably in close proximity to the latter.

Reflector 13$c$ is rotatable about a fixed axis which is located in substantial close proximity to the point 14$c$ and which is normal to the plane of the drawing. The point 14$c$ is located on the reflector surface of the reflector 13$c$. Preferably the reflector surface has a symmetrical configuration with the point 14$c$ located at its center. During the imaging cycle, reflector 13$c$ rotates through a predetermined angle $\Theta'$. In FIG. 6, reflector 13$c$ is shown at two different positions indicated by the solid and phantom lines, respectively, which occur during the imaging cycle. In FIGS. 7$a$—7$c$, the reflector 13$c$ is shown at three different position, respectively, which occur during the imaging cycle. The positions of reflector 13$c$ illustrated in FIGS. 7$b$ and 7$c$ correspond substantially to its solid and phantom line positions, respectively, of FIG. 6. It should be understood that the FIGS. 6, 7$a$—7$c$ are not drawn to scale. The stationary object O is substantially coplanar with the primary focal plane P of lens 11$c$ and preferably lies, i.e. is disposed, symmetrically in its field of view.

During the system's imaging cycle, receptor R moves in a given direction, e.g. the direction indicated by the arrow A in FIGS. 6, 7$a$—7$c$. Moreover, the image plane of receptor R is coincident with the secondary focal plane S of lens 12$c$ as it moves past that lens' field of view. Simultaneously, reflector 13$c$ is rotated during the imaging cycle by a suitable driving means, not shown, in a coordinated manner with the movement of the image receptor R. More particularly, for the given direction A, the reflector 13$c$ is rotated in the direction B about the aforementioned axis located near the point 14$c$.

As previously explained, emanating from each point on the object O is a bundle of divergent light rays. In FIGS. 7$a$—7$c$ there are shown, by way of example, three object points, to wit: X0, X1, and X2, and certain particular ones of their associated light rays, to wit: rays 17–0$'$ to 19–0$'$, rays 17-1$'$ to 19-1$'$, and rays 17-2$'$ to 19-2$'$ associated with the points X0, X1, X2, respectively. The points X0, X1, and X2 are colinear and the line so formed and the principal axis of lens 11$c$ are coplanar with the plane of the drawing. The aforementioned illustrated rays in FIGS. 7$a$—7$c$ are also coplanar and located in the plane of the drawing. For sake of clarity, the rays 17–0$'$ and 18–0$'$, the rays 17-1$'$ and 18-1$'$, and the rays 17-2$'$ and 18-2$'$ are not shown in FIGS. 7$b$ and 7$c$ and only the divergent portions of these rays are shown in FIG. 7$a$. These last-mentioned rays represent the limit or extreme rays intercepted by the field of view of lens 11$c$ in the absence of the shielding member 15$c$ of FIG. 1. Rays 19–0$'$, 19-1$'$, and 19-2$'$ are the respective chief rays associated with their respective object points X0, X1, X2 which, as aforementioned, intercept the center 14$c$ of the aperture stop 13$c$. As can be readily seen in FIGS. 7$a$—7$c$, since the object O is stationary the chief rays of the different object points are collimated by the lens 11$c$ in their same mutually exclusive different directions irrespective of the position of the reflector 13$c$ during the imaging cycle. For purposes of explanation, it is assumed that the object O is symmetrically disposed in the field of view of lens 11$c$ in its primary focal plane, as aforementioned, and that the point X1 is aligned with the principal axis of lens 11$c$ and consequently its chief ray 19–1 is coincident with that axis.

The operation of the embodiment of FIG. 6 will now be discussed with reference to FIGS. 7$a$—7$c$ and for this purpose it is assumed that the aforementioned optional member 15$c$ is not provided. In FIG. 7$a$, the imaging cycle has commenced and the leading end of the moving receptor R, as viewed therein, is in a position slightly above the principal axis 12$c'$ of lens 12$c$ and the reflector 13$c$ is rotating in the direction B. From each object point a bundle of light rays emanate. Light rays which belong to the same bundle and are in the field of view of lens 11$c$ are collimated by lens 11$c$ in the same direction. Because of the different positions of the object points with respect to the lens 11—$c$, each of the bundles of light rays so collimated has its own mutually exclusive direction of collimation. Thus, for example, these light rays of the bundle which is associated with point X0, which are collimated by lens 11$c$ emerge therefrom in the same directions and are parallel to the direction of the collimated portion of their associated chief ray 19–0$'$, that is, the portion of ray 19–0$'$ illustrated in FIG. 7$a$ between lens 11$c$ and reflector 13$c$. For the particular angular inclination or position of member 13c, shown in FIG. 7a, those collimated light rays associated with the point X0 which are incident to the reflector 13c are reflected towards the focusing lens 12c by reflector 13c at an angle of reflection corresponding to their respective angle of incidence. Thus, the reflected collimated light rays, which are derived from the bundle X0, have the same direction as the reflected collimated portion of their associated chief ray 19–0' that is the portion of ray 19 illustrated in FIG. 7a between the reflector 13c and the lens 12c. For the particular angular position of reflector 13c shown in FIG. 7a the reflected collimated light rays associated with point X0 are parallel to the principal axis 12c' of lens 12c. These last-mentioned reflected collimated light rays which are incident to lens 12c are in turn focused exclusively in turn in the image plane of the stationary receptor R at the conjugate image point X0', which in FIG. 7a is aligned with the principal axis 12c'.

Simultaneously, the light rays of the bundle associated with object point X1, which are in the field of view of lens 11c, are collimated by the lens 11c in a direction which is parallel to the collimated portion of their associated chief ray 19–1'. Since the angle of incidence between the collimated portion of the chief ray 19–1' and the reflector 13c is different than the angle of incidence between the collimated portion of the chief ray 19–0' and reflector 13, their respective angles of reflection are also correspondingly different. The incident collimated light rays of the bundle derived from point X1 is thus reflected by reflector 13c in their own particular mutually exclusive direction. Accordingly, the reflected collimated light rays, which are associated with the point X1 and which are incident to the lens 12c, are exclusively focused by the latter at the conjugate image point X1'.

In a similar manner, the conjugate image point X2' is formed by apparatus 10c from certain ones of the light rays of the bundle which is associated with the object point X2. The image points X0', X1', and X2' are in focus and the relative spacing between the points X0', X1', and X2' is directly proportional to the spacing between the object points X0, X1, and X2 and depends on the respective focal lengths of lenses 11c and 12c.

Referring now to FIG. 7b, the moving receptor R has moved to the position where the conjugate image point X1 is now coincident with the principal axis 12c' of lens 12 and the reflector 13 has advanced further in the direction B to the angular position shown therein. As before, from each object point a bundle of divergent light rays emanates. The light rays which belong to the same bundle and which are in the field of view of lens 11c are collimated by lens 11c in the same direction. Each of the bundles of light rays so collimated again has its own mutually exclusive direction of collimation. However, because each of the points of the stationary object remains in the same position relative to lens 11c, the direction of collimation of the particular object point's associated light rays is the same as its direction of collimation that it previously had and that it will have thereafter. However, the movements of the reflector 13c and receptor R are judiciously coordinated such that those incident collimated rays of the bundle associated with any particular object point, when reflected by reflector 13c and collected by lens 12c, are maintained exclusively focused in the same spatial position of the moving image plane that is at its previous and same conjugate image point. Thus, as is shown in FIG. 7b, each of the chief rays 19–0', 19'1' and 19–2' are collimated by lens 11c in the same direction it previously had, c.f. FIG. 7a, or it will thereafter have, c.f. FIG. 7c. The collimated directions coact with the new angular position of reflector 13c cause the rays 19–0', 19–1', and 19–2' to be reflected into lens 11c and be focused by the latter at their same respective previous conjugate image point positions in the moving image plane.

In FIG. 7c, the receptor R has advanced to the position where the image point X1' is coincident with the optic axis 12c of lens 12 and the reflector 13b has further advanced in the direction B. For the reasons previously explained, the incident collimated light rays derived from each of the different object points are again reflected in such a manner by reflector 13c into the lens 12c so as to be focused at their same respective conjugate image point positions. For example, the bundles of light rays associated with the object points XO. X1 X2, as shown by their respective chief rays 19–0', 19–1', and 19–2' in FIG. 7c, are focused at their previous conjugate image points X0', X1', and X2'. Thus, as shown in FIGS. 7a–7c, the stationary object O is imaged by the optical apparatus 10c during the imaging cycle onto the image plane of the moving receptor R in focus and in the same image position and hence without distortion.

The imaging system of FIG. 6 is further enhanced by the inclusion of the slotted member 15c as shown in FIG. 6. It should be understood that in FIG. 6 when the reflector 13c is in the illustrated solid line position, slit 16c substantially passes only the light rays, e.g. rays 17–1' to 19–1' from point X1 which are collimated by lens 11c, reflected by reflector 13c and focused by lens 12c. Rays from other points not in the immediate proximity of point X1, such as, for example, the rays 17–2' to 19–2' from point X2, which are collimated by lens 11c and reflector by reflector 13c and focused by lens 12c, are focused, however, on the body of the shield member 15c. Similarly, when the reflector 13 is in the illustrated dash line position, substantially only the focused light rays, e.g. rays 17–2' to 19–2', from point X2 will be passed by the slit 16a; whereas rays not in the immediate proximity of point X2, e.g. rays 17–1' and 19–1' from point X1, but which are passed by elements 11c, 12c, and 13c, are blocked by member 15c. Thus, the member 15c in coaction with its slit 16c and the optical apparatus 10c blocks stray light, as well as the particular reflected collimated light rays focused by lens 12c which are not incident to the slit 16c. Because the narrow width dimension of the slit 16 has a finite limitation, for any given instant of time, it will also pass the chief rays and their closely adjacent related rays of the object points immediately adjacent to or near the particular object point whose reflected collimated chief ray is coincident with the principal axis of lens 12c. Nevertheless, each of the chief rays and their closely adjacent related rays so passed are imaged by the optical apparatus 10c in focus at their respective conjugate image point positions in the moving image plane of the receptor R in focus and without distortion.

After each imaging cycle, the reflector 13c is returned by driving means, not shown, to its initial position and is ready for the next imaging cycle. The driving means may be of the type which returns the reflector 13c during the return cycle in the same direction B, or it may be of the type that reverses the direction of rotation of the reflector 13c during the return cycle. Because the reflector 13c is the aperture stop of the system, it may be relatively small since the chief rays of the various object points all pass through its center. This allows the moving reflector 13c to be constructed with relatively low mass. The concomitant low inertia characteristic of the reflector 13c allows fast imaging cycles and/or faster return cycles. The initiation of the imaging cycle may be synchronized, by suitable means not shown, when the moving receptor R reaches a suitable predetermined position with respect to the lens 12c.

The imaging system illustrated in FIGS. 6, 7a–7c may be of the image recording, image viewing or image sensing types. For example, as an image recording system the receptor R could be the recording surface of an image recorder such as the photographic emulsion layer of a moving photographic film or such as the xerographic recording surface of a xerographic drum.

Figure 8:
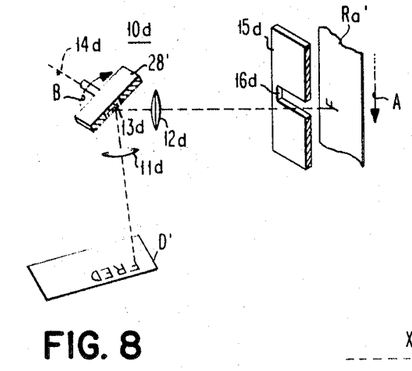
FIG. 8 is a partial schematically illustrated perspective view of an image recording system of the present invention utilizing the principles of the imaging system and moving optical apparatus of FIG. 6.

Referring now to FIG. 8 there is partially shown an image recording system embodiment of the present invention for recording the image of the stationary document D' on a moving film Ra'. The system of FIG. 8 includes moving optical apparatus 10d which is identical to the apparatus 10c of FIG. 6. Briefly, optical apparatus 10d includes in cascaded optical alignment collimating and focusing stationary lenses 11d and 12d, respectively, and an elliptically shaped rotatable reflector 13d which is the aperture stop of the system. Reflector 13d is supported by the support plate member 28'. Reflector 13d and member 28' are shown partially broken away for sake of clarity. Document D' is coplanar with the primary focal plane of lens 11d and is in stationary and symmetrical alignment with its principal axis of lens 11 during the imaging cycle. During the imaging cycle the moving film Ra' is in coplanar alignment with the secondary focal plane, not shown, of lens 12d and is aligned with its principal axis. Preferably, there is provided an opaque shielding member 15d, partially shown, having an elongated slit 16d which is transverse to the direction A of the movement of the film Ra'. The member 15d is juxtaposed between lens 12d and its aforementioned secondary focal plane. Slit 16d of the member 15d is aligned with the principal axis of lens 12d.

Briefly, in operation, during the imaging cycle of the system of FIG. 8, support member 28' and consequently reflector 13d is pivoted about the axis 14d in direction B. Simultaneously, the film Ra' is moved in a coordinated manner with the rotation of reflector 13d in the direction A past the field of view of lens 12d. As a result, the document D' is imaged by the apparatus 10d through the slit 16d in the emulsion surface of the moving film Ra' similar to the operation of the apparatus 10c of FIG. 6. The light rays passing by apparatus 10d and slit 16d expose the film and at the completion of the imaging cycle a latent image of the document is recorded in the film Ra'. The film Ra' is thereafter subsequently developed.

The present invention is particularly useful for imaging objects, and particularly flat or planar objects, on a planar, i.e. flat, image plane, one of which is moving. However, it should be understood that the invention could also be practiced where the image plane is curved, for example, such as in certain image recording systems where the image recording surface is located on a rotating drum or the like. If the degree of curvature is fairly flat in the area or under the station where the imaging is taking place, the system of the invention may be used without any modification. For greater degrees of curvature, the system may be modified, for example, by the use of a corrective lens or the like to compensate for the curvature of the image plane.

Figure 9:
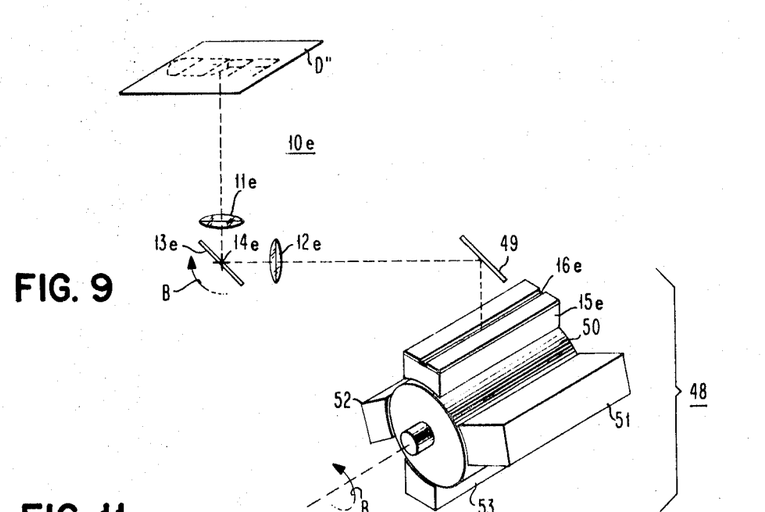
FIG. 9 is a partial schematically illustrated perspective view of another embodiment of an image recording system of the present invention utilizing the principles of the imaging system and moving optical apparatus of FIG. 6.

Referring now to FIG. 9 there is partially shown an image recording system embodiment of the present invention of the document copying type in which a stationary document is imaged on a receptor that is a rotating recording drum. The embodiment of FIG. 9 is preferably a xerographic type recording system.

The document D" of FIG. 9 is inserted at the systems's input and the image recording apparatus, generally indicated by the reference numeral 48, is located at the system's output. For sake of clarity, document D and apparatus 48 are shown in perspective in FIG. 9; whereas the optical apparatus 10e and stationary mirror 49 are shown schematically for sake of clarity. The system includes moving optical apparatus 10e which is similar to the optical apparatus 10c, 10d of FIGS. 6 and 8, respectively. More specifically, apparatus 10e includes in cascaded optical alignment the collimating and focusing lenses 11e and 12e, respectively, and a suitable reflector 13e which is pivotable about the axis 14e and is the aperture stop of the system. Mirror 49 optically couples the lens 12e to the recording surface of the recording drum 50.

The stationary document D" is aligned in the field of view of collimating lens 11e and is preferably symmetrically aligned with the principal axis of lens 11e. The plane of document D" is coplanar with the principal focal plane of collimating lens 11e. Aligned with the principal axis of lens 12e is the stationary reflecting mirror 49 which reflects the focused light emanating from lens 12e through the elongated slit 16e of an opaque shielding member 15e. The sum of the distances between the lens 12e and mirror 49, and between mirror 49 and the surface of the drum 50 located beneath slit 16e is equal to the distance between lens 12e and its secondary focal plane. The recording apparatus 48 includes, as is well known to those skilled in the art, a cylindrical drum 50 whose outer lateral surface is coated with an electrostatic image recording material such as photosensitive selenium, for example. In addition, there is provided adjacent to the drum and at different peripheral stations stationary electrostatic charging means 51, electrostatic developing means 52, and electrostatic transfer means 53, each of which is shown schematically in block form for sake of clarity. The elements 50—53 are well known to those skilled in the art.

In operation, during the imaging cycle, the optical apparatus 10e of FIG. 9 in coaction with mirror 49 and slit 16e images the stationary document D" on the electrostatically charged recording surface of the drum 50 that is rotating in the direction B. As is well know to those skilled in the art, the drum surface has been electrostatically charged as it passes beneath the electrostatically charging station, i.e. means 51. The image projected by the apparatus 10e on the recording surface forms a pattern of electrostatically charged and discharged areas which correspond to the image of the document. As the drum 50 advances in the direction B it passes beneath the developing station 52. As a result, the latent electrostatic image is developed by means 52 by oppositely charged dry powder which adheres to the drum surface. The negatively charged powder image is subsequently transferred at the image transfer station 53 by placing a positive charge on a recording paper, not shown, as it contacts the drum. The recording paper passes under an enclosed heating grid which permanently fuses the image. Thereafter, the rotating drum is cleaned, by means not shown, and recharged by the electrostatic charging station 51 for the next cycle. The system of FIG. 9 preferably provides a one-to-one reduction of the document to the aforementioned recording paper, not shown.

Referring now to FIG. 10, there is shown a top view of a suitable reflector which is preferably used in the embodiments of FIGS. 1—9 of the present invention. The reflector includes a reflector surface 13a' mounted on a support member 28'. The reflector surface 13a' is shaped in an elliptical configuration, the minor axis of which is parallel to the axis 14a of rotation of the reflector. The elliptical configuration provides compatible optical symmetrical coupling between the angularly displaced collimating and focusing lenses. The moving one of the object or receptor preferably moves in a direction which transverses the minor axis at right angles, and if an elongated slit shielding member is provided the elongated dimension of the slit is parallel to the minor axis.

Figure 11:
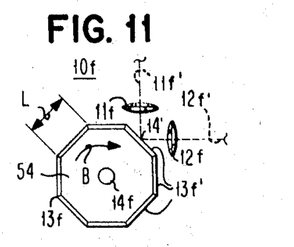
FIG. 11 is an end view of another embodiment of the reflector of the optical apparatus of the present invention.

In FIG. 11 the optical apparatus 10f is another embodiment of the present invention and includes in cascaded optical alignment collimating lens 11f, focusing lens 12f, and a rotatable reflector member 13f which is comprised of multiple reflecting surfaces, e.g. reflecting surface 13f', each of which is mounted on the lateral walls of a symmetrical poly-sided drum 54. By way of example, drum 54 is shown in FIG. 9 as being an octagonal-sided drum. The reflecting surfaces 13f' are sequentially aligned with the point 14' of intersection of the respective principal axes 11f', 12f' of lenses 11f and 12f as the drum 54 rotates about the axis 14f. Each reflective surface, e.g. surface 13f', preferably has an elliptical configuration with its minor axis parallel to the axis 14f. The radial dimension of the drum and/or the dimension, e.g. dimension L, of the major axis of each elliptical-shaped reflector surface 13f' is judiciously selected so that the point 14 lies substantially in the plane of the particular reflector surface as it passes by the point 14'. Each reflector surface 13f' in coaction with the other optical elements 11f, 12f of apparatus 10f is adapted to image an object, or alternatively a predetermined part of an object in the image plane of the image receptor in focus and without distortion as the particular reflector surface 13f' passes by the point 14'. Again, each reflector surface 13f' is the aperture stop of the system as the particular reflector surface 13f' passes by the point 14'. For reasons previously explained, the rotational movement of the drum 54 is coordinated with the movement of the object or objects, not shown, or of the receptor, not shown, as the case may be.

The invention has been described hereinabove as using respective single lens elements for providing the collimating and focusing functions. It should be understood, however, the invention may be modified to utilize a multielement collimating lens system and/or a multielement focusing lens system as is obvious to those skilled in the art.

In addition, the optical apparatus of the invention has been described hereinabove in certain of the embodiments as being in direct optical coupling relationships during the imaging cycle with the object and receptor, respectively, c.f. FIGS. 1—4 and 6—8. In the embodiment of FIG. 5, the optical apparatus is described as being in indirect and direct optical coupling relationships with the object and receptor, respectively, during the imaging cycle. Still in another embodiment, c.f. FIG. 9, the optical apparatus is described as being in direct and indirect coupling relationships with the object and receptor, respectively, during the imaging cycle. As is obvious to those skilled in the art, the invention may also be practiced where the optical apparatus is in respective indirect coupling relationships with both the object and receptor. Furthermore, the indirect coupling relationships may be effected by one or more mirrors, e.g. mirror 49 of FIG. 9, and/or by one or more other optical elements such as the aforementioned corrective lens, shutters, etc.

It should be further understood that a suitable illumination source such as the lamp 36 of FIGS. 3—4 may be provided, if required, for illuminating the object during the imaging cycles.

For sake of clarity in the embodiments of FIGS. 1, 2a—2d and FIGS. 6—11, the means for coordinating the movements of the rotatable reflector and the particular moving one of the object and receptor has not been shown. Moreover, it should also be understood that in FIG. 11 the drum 54 has been drawn on an enlarged scale relative to the optical elements 11f, 12f for sake of clarity.

Thus, while the invention has been particularly shown and described with reference to the preferred embodiments, it will be understood by those skilled in the art that the foregoing and other changes in form and detail may be made therein without departing from the spirit and scope of the invention.

We claim:

1. An imaging system having optical apparatus for imaging an object in the image plane of an image receptor means, a predetermined one of the object and image receptor means being in mutually exclusive movement with respect to the other during the imaging cycle of said system, said optical apparatus having in cascaded optical alignment the combination comprising:
    stationary collimating first lens means for collimating the light from said object during said imaging cycle, said first lens means having a predetermined first optical coupling relationship with said object during said imaging cycle;
    stationary focusing second lens means having a predetermined second optical coupling relationship with said receptor means during said imaging cycle; and
    rotatable reflector means disposed between said first and second lens means, said reflector means being the aperture stop of said system and being rotated about a predetermined fixed axis in a predetermined coordinated relationship with said mutually exclusive movement to reflect the collimated light from said collimating lens means incident thereto into said focusing lens means during said imaging cycle, and said focusing lens means during said imaging cycle focusing said reflected collimated light from said reflector means in focus and in the same position in the image plane of said receptor means irrespective of said mutually exclusive movement of the predetermined one of said object and image receptor means.

2. An imaging system according to claim 1 further comprising opaque member means having an elongated slit in optical alignement with said optical apparatus, said opaque member means being disposed between said optical apparatus and the predetermined moving one of said object and image receptor means.

3. An imaging system according to claim 1 wherein said rotatable reflector means further comprises at least one reflector surface having an elliptical configuration.

4. An imaging system according to claim 1 wherein said receptor means is an image viewing surface.

5. An imaging system according to claim 1 wherein said receptor means is an image sensing surface.

6. An imaging system according to claim 1 wherein said receptor means is an image recording surface.

7. An imaging system according to claim 6 wherein said image recording surface is of the photographic recording type.

8. An imaging system according to claim 6 wherein said image recording surface is of the xerographic recording type.

9. An imaging system according to claim 6 wherein said object and said recording surface have respective planar configurations.

10. An imaging system according to claim 6 wherein said object has a planar configuration and said recording surface has a predetermined curvature.

11. An image recording system having optical apparatus for imaging a moving planar object in the image plane of a stationary planar image recording surface during the imaging cycle of said system, said optical apparatus having in cascaded optical alignment the combination comprising:
    stationary collimating first lens means for collimating the light from said object during said imaging cycle, said first lens means having a predetermined first optical coupling relationship with said object during said imaging cycle;
    stationary focusing second lens means having a predetermined second optical coupling relationship with said image recording surface during said imaging cycle; and
    rotatable reflector means disposed between said first and second lens means, said reflector means being the aperture stop of said system and rotated about a predetermined fixed axis in a predetermined coordinated relationship with the movement of said object to reflect the collimated light from said collimating lens means incident thereto into said focusing lens means during said imaging cycle, and said focusing lens means during said imaging cycle focusing said reflected collimated light from said reflector means in focus and in the same position in the image plane of said image recording surface irrespective of the movement of said object.

12. An image recording system according to claim 11 wherein the rotatable reflector means further comprises at least one reflector surface having an elliptical configuration.

13. An image recording system according to claim 11 wherein said image recording surface is a photographic emulsion.

14. An image recording system according to claim 13 further comprising opaque member means having an elongated slit in optical alignment with said optical apparatus, said opaque member means being disposed between said optical apparatus and the moving object.

15. An image recording system having optical apparatus for imaging a stationary planar object in the image plane of a moving image recording surface during the imaging cycle of said system, said optical apparatus having in cascaded optical alignment the combination comprising:
    stationary collimating first lens means for collimating the light from said object during said imaging cycle, said first lens means having a predetermined first optical coupling relationship with said object during said imaging cycle;
    stationary focusing second lens means having a predetermined second optical coupling relationship with said image recording surface during said imaging cycle; and
    rotatable reflector means disposed between said first and second lens means, said reflector means being one aperture stop of said system and rotated about a predetermined fixed axis in a predetermined coordinated relationship with the movement of said recording surface to reflect the collimated light from said collimating lens means incident thereto into said focusing lens means during said imaging cycle, and said focusing lens means during said imaging cycle, and said focusing lens means during said imaging cycle focusing said reflected collimated light from said reflector means in focus and in the same position in the image plane of said recording surface irrespective of the movement of said image recording surface.

16. An image recording system according to claim 15 wherein said rotatable reflector means further comprises at least one reflector surface having an elliptical configuration.

17. An image recording system according to claim 15 wherein said image recording surface is of the photographic recording type and has a planar configuration.

18. An image recording system according to claim 17 further comprising opaque member means having an elongated slit in optical alignment with said optical apparatus, said opaque member means being disposed between said optical apparatus and the moving image recording surface.

19. An image recording system according to claim 15 wherein said image recording surface is of the xerographic recording type and has a predetermined curvature.

20. An image recording system according to claim 19 further comprising opaque member means having an elongated slit in optical alignment with said optical apparatus, said opaque member means being disposed between said optical apparatus and the moving image recording surface.

21. An image recording system having optical apparatus for imaging both first and second sides of a moving planar document in mutually exclusive different first and second positions, respectively, of the image plane of a stationary planar image recording surface during sequential first and second imaging cycles, respectively, of said system, said optical apparatus having in cascaded optical alignment the combination comprising:

stationary collimating first lens means for collimating the light from said first side during said first imaging cycle and for collimating the light from said second side during said second imaging cycle, said first and second sides having a predetermined first optical coupling relationship with said first lens means during said first and second imaging cycles, respectively;

stationary focusing second lens means having a predetermined second optical coupling relationship with said first and second positions of said imaging surface during said first and second imaging cycles, respectively; and rotatable reflector means disposed between said first and second lens means, said reflector means being the aperture stop of said system and rotated about a predetermined fixed axis in a predetermined coordinated relationship with the movement of said document to reflect the collimated light from said collimating lens means incident thereto into said focusing lens means during each of said imaging cycles, and said focusing lens means during said first and second imaging cycles, respectively, focusing said reflected collimated light from said reflector means in focus and in the first and second positions, respectively, of the image plane of said image recording surface irrespective of the movement of said document.

22. An image recording system according to claim 21 wherein said image recording surface is a photographic emulsion.

23. An image recording system according to claim 21 further comprising first and second opaque members, each of said members having an elongated slit in optical alignment with said optical apparatus, each of said opaque members being disposed between said optical apparatus and a mutually exclusive one of said sides of said moving document.